H. F. DUNNING.
TOY.
APPLICATION FILED JULY 22, 1919. RENEWED APR. 22, 1921.
1,393,512.
Patented Oct. 11, 1921.
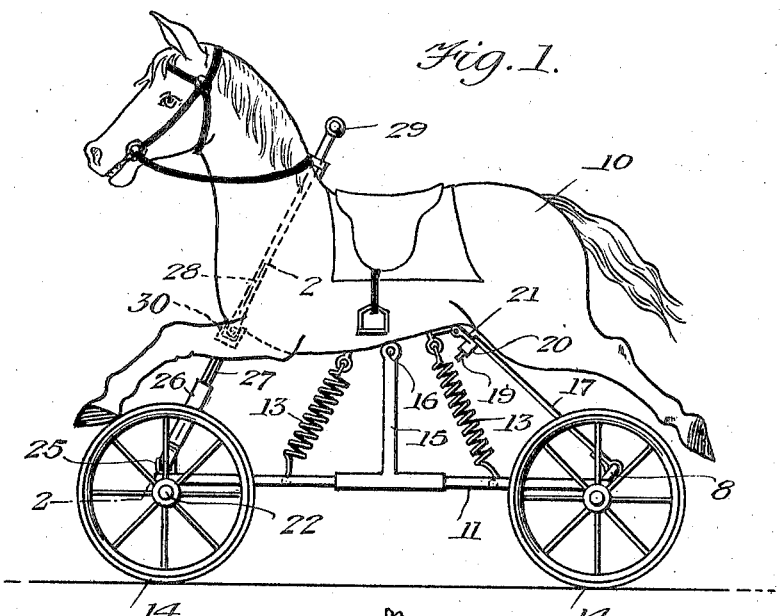
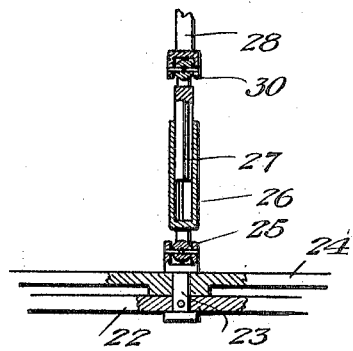
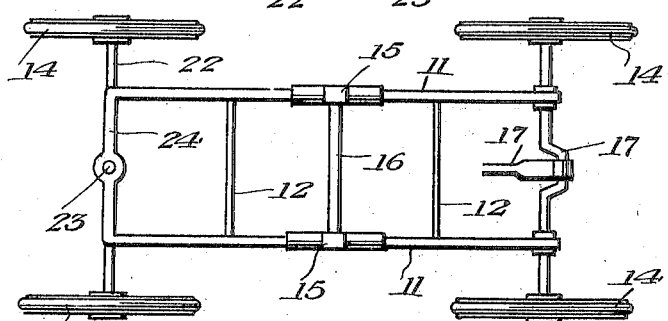
WITNESS:
INVENTOR.
BY H. F. Dunning
Victor J. Evans
ATTORNEY.

UNITED STATES PATENT OFFICE.

HIRAM F. DUNNING, OF TURTLEFORD, SASKATCHEWAN, CANADA.

TOY.

1,393,512. Specification of Letters Patent. Patented Oct. 11, 1921.

Application filed July 22, 1919, Serial No. 312,598. Renewed April 22, 1921. Serial No. 463,573.

*To all whom it may concern:*

Be it known that I, HIRAM F. DUNNING, a citizen of United States of America, residing at Turtleford, in the Province of Saskatchewan and Dominion of Canada, rancher, have invented new and useful Improvements in Toys, of which the following is a specification.

This invention relates to hobby-horses, where the horse is mounted for rocking movement upon a portable frame, in a manner whereby the rocking movement of the horse results in the forward movement of the structure in its entirety.

One of the chief objects of the invention resides in the provision of a connection between the hobby-horse and the portable frame for the purpose above mentioned, and which means can be disconnected so that the horse can be rocked without imparting movement to the portable frame.

In carrying out my invention, I also provide a novel means for steering the device, the invention embodying the desired features of simplicity, construction and durability.

The nature and advantages of the invention will be better understood when the following detailed description is taken in connection with the accompanying drawings, the invention residing in the construction, combination and arrangement of parts as claimed.

In the drawing forming part of this specification, like numerals of reference indicate similar parts in the several views and wherein:—

Figure 1 is a side elevation of the device forming the subject matter of my invention.

Fig. 2 is a fragmentary detail sectional view taken on the line 2—2 of Fig. 1.

Fig. 3 is a plan view of the portable frame.

Referring more particularly to the drawing in detail, the hobby horse is indicated generally at 10 and is mounted for rocking movement upon a portable frame as shown. The frame essentially embodies the spaced parallel side members 11 which are connected together and suitably braced by a transverse rod 12. The latter also provides a connection for one end of springs 13 which engage the body of the horse to assist in the easy rocking motion of the latter. The frame is mounted upon front and rear wheels 14, so that the structure in its entirety may be progressed or moved forwardly upon rocking of the horse in a manner to be hereinafter described. Rising from the side members 11 are spaced standards 15 which form bearings for a rod 16 which supports the horse 10 for rocking movement.

For the purpose of moving the structure forwardly, upon rocking movement of the horse 10, I make use of a rod 17 which is terminally connected to the crank portion 18 of the rear axle, while the opposite end of this rod is offset as at 19. The offset portion 19 is removably fitted in a sleeve-like portion 20 of a plate 21 which is hingedly mounted upon the body 10 of the horse. Manifestly, as the horse is rocked, in the usual manner, motion is transmitted through the rod 17 to the rear axle with the result that the wheeled frame is moved in a forward direction. When use of the hobby-horse is desired, without transmitting motion to the portable frame, the rod 17 can be separated from the plate 21, by removing the offset portion 19 from the plate 20. When disconnected, the rod 17 may rest upon the transverse members 12.

The front axle 22 is supported by a headed bolt 23 which is journaled within the cross member 24 for the purpose of steering the device. A universal connection 25 joins one end of a squared sleeve 26 with the bolt 23 the sleeve 26 being adapted to receive the squared portion 27 of a steering rod which includes a portion 28 which is passed through the body 10 of the horse and provided with a handle 29 conveniently disposed for use. A universal connection 30 joints the respective sections 27 and 28 of the steering rod, the universal connection 25 and 30, coupled with the sliding movement of the section 27, within the sleeve 26, provides for the proper relative movement of the section 27 of the rod with regard to the rocking movement of the horse 10, and permits of turning of the rod to steer the structure under any conditions. Any suitable material may be employed in the construction of the device, and it may also vary in size, without departing from the spirit of the invention.

While it is believed that the nature and advantages of the invention will be readily apparent, from the foregoing description, I desire to have it understood that what is herein shown and described is merely illustrative of the preferred embodiment of the invention to which I do not limit myself, and that such changes may be resorted to when desired as fall within the scope of what is claimed.

Having thus described my invention what I claim as new is:—

1. In combination, a wheeled frame, a hobby-horse mounted thereon for rocking movement, a connection between the horse and said frame whereby a forward movement is imparted to the latter, when the horse is rocked, a steering rod comprising two sections, a universal connection between said sections, one section being connected to the body of the horse for rotation and movement therewith, a squared sleeve, a universal connection between the sleeve and the front axle, and said sleeve slidably receiving the other section of said rod, the latter mentioned section being squared whereby the structure may be steered upon the turning of said rod.

2. In combination, a wheeled frame, a hobby horse mounted thereon for rocking movement, a plate hingedly connected to the body of the horse and having a sleeve-like portion, a connection between the body of the horse and the rear axle of the frame, whereby the latter is moved forwardly upon rocking movement of the horse, said connection including a rod having an offset extremity removably fitted within said sleeve, and means for steering the structure.

3. In combination, a wheeled frame, a hobby horse mounted thereon for rocking movement, a coiled spring terminally connected with the frame and with the body of the horse, a plate hingedly connected with the body of the horse, and including a sleeve like portion, a connection between the body of the horse and the rear axle of the frame whereby the latter is moved forwardly with the rocking movement of the horse said connection including a rod having an offset extremity removably fitted within the sleeve, and means for steering the structure.

In testimony whereof I affix my signature.

HIRAM F. DUNNING.